United States Patent
Aggarwal et al.

(10) Patent No.: US 11,695,834 B1
(45) Date of Patent: Jul. 4, 2023

(54) SAAS APPLICATION RECOMMENDATION, APPROVAL, AND FULFILLMENT IN A SAAS MANAGEMENT PLATFORM

(71) Applicant: Productiv, Inc., Palo Alto, CA (US)

(72) Inventors: Ashish Aggarwal, Los Altos Hills, CA (US); Alex Van Liew, Seattle, WA (US); Amit Bhosle, Redmond, WA (US)

(73) Assignee: Productiv, Inc., Pato Alto, CA (US)

( * ) Notice: Subject to any disclaimer, the term of this patent is extended or adjusted under 35 U.S.C. 154(b) by 0 days.

(21) Appl. No.: 18/073,433

(22) Filed: Dec. 1, 2022

Related U.S. Application Data

(63) Continuation of application No. 18/073,389, filed on Dec. 1, 2022.

(51) Int. Cl.
  *H04L 67/12* (2022.01)
  *G06Q 10/105* (2023.01)
(52) U.S. Cl.
  CPC ........... *H04L 67/12* (2013.01); *G06Q 10/105* (2013.01)
(58) Field of Classification Search
  CPC ...................................................... H04L 12/09
  See application file for complete search history.

(56) References Cited

U.S. PATENT DOCUMENTS

| | | | |
|---|---|---|---|
| 2013/0297700 A1* | 11/2013 | Hayton | G06Q 10/10 709/204 |
| 2014/0032758 A1* | 1/2014 | Barton | H04W 12/37 709/225 |
| 2017/0024794 A1* | 1/2017 | Bianchini | G06Q 30/0631 |
| 2017/0318083 A1* | 11/2017 | Ignatyev | H04L 43/0876 |
| 2018/0007059 A1* | 1/2018 | Innes | G06F 21/6218 |
| 2020/0073979 A1* | 3/2020 | Bandyopadhyay | H04L 67/10 |
| 2020/0145425 A1* | 5/2020 | Chauhan | H04L 67/52 |

* cited by examiner

*Primary Examiner* — Quang N Nguyen
(74) *Attorney, Agent, or Firm* — Penilla IP, APC

(57) ABSTRACT

A method implemented in a Software as a Service (SaaS) management platform (SMP) is provided, including: identifying a plurality of SaaS applications used by a customer of the SMP; receiving, over a network, human resources (HR) data from an HR application, said HR data describing an organization chart of users that are employees of the customer of the SMP; providing, over a network, an administrator interface for rendering through a client device operated by an administrative user of the customer; receiving input from the client device via the administrator interface, said input identifying a given SaaS application and a managerial group within the organization chart; and responsive to receiving said input, then storing an approval setting for the managerial group for the given SaaS application, the approval setting determines whether a user within the managerial group requires approval to enable granting of a license to use the given SaaS application.

20 Claims, 12 Drawing Sheets

Productiv

Choose apps for your AppCenter

Select which apps you would like to include in your AppCenter
255 apps included (out of 276 in portfolio)

Cancel | Save and keep updating | Save and finish

| App | Category | In AppCenter | Featured | App status | Active licenses | Provisioned licenses | Labels |
|---|---|---|---|---|---|---|---|
| Snack | Conferencing | ☒ | ☐ | Approved | 17,073 | 19,476 | Completed-Terminated |
| Dellsoft | Office Suites | ☒ | ☐ | Not approved | 10,221 | 11,971 | Completed-Terminated |
| Kira Software | Project Management | ☒ | ☒ | None | 9,835 | 10,524 | * |
| Octo | Identify & Access Management | ☒ | ☐ | None | 8,981 | 11,359 | * |
| Midterm | Marketing Analytics | ☒ | ☐ | None | 8,624 | 12,168* | * |
| Hubcap | CRM | ☒ | ☐ | Approved | 7,467 | 10,389* | PII-data | Customer-data |
| Sertafi | Expense Management | ☒ | ☐ | None | 7,457 | 12,014* | * |
| Hellsing | Electronic Signature | ☒ | ☐ | None | 7,231 | 10,299* | * |
| Newaura | Other Customer Services | ☒ | ☐ | None | 7,127 | 9,445* | * |
| Slingcord | Other HR Apps | ☒ | ☐ | None | 6,592 | 12,191* | * |
| Servos ITSM | Ticketing | ☒ | ☐ | None | 6,414 | 6,510 | PII-data | PII-data |
| Borlagix | Other Developer Apps | ☒ | ☐ | None | 6,350 | 8,506* | * |
| Sox | Sharing & Storage | ☒ | ☒ | None | 6,118 | 8,998 | PII-data | Customer-data |

SAAS APPLICATION RECOMMENDATION, APPROVAL, AND FULFILLMENT IN A SAAS MANAGEMENT PLATFORM

CLAIM OF PRIORITY

This application claims priority as a continuation and the benefit of U.S. patent application Ser. No. 18/073,389 filed on Dec. 1, 2022, entitled "SAAS Application Recommendation, Approval, and Fulfillment in a SAAS Management Platform", the disclosure of which is incorporated herein by reference in its entirety for all purposes.

1. Field of the Disclosure

The present disclosure relates to SaaS application recommendation, approval, and fulfillment in a SaaS management platform.

BACKGROUND

2. Description of the Related Art

Software as a service (SaaS) is a software distribution model in which applications are cloud-hosted and made available to end users over the Internet. This is advantageous for the end users in that a SaaS application is provided "as a service," such that the end users are not required to host or maintain the application, and are enabled to access the application from practically anywhere with sufficient network connectivity. However, the rise of SaaS adoption amongst corporate entities also presents problems from a management perspective. As a given corporate entity may subscribe to many different SaaS applications, efficient SaaS management becomes increasingly difficult as a result.

It is in this context that implementations of the disclosure arise.

SUMMARY

Implementations of the present disclosure include methods and systems relating to SaaS application contract terms benchmarking in a SaaS management platform.

In some implementations, methods for recommendation of SaaS apps for employees are provided. For example, in some implementations, a method implemented in a Software as a Service (SaaS) management platform (SMP) is provided, the SMP implemented in a cloud resource having at least one processor and at least one storage device, the method including the following operations: receiving, over a network, human resources (HR) data from an HR application, said HR data describing an organization chart of employees of a customer of the SMP; identifying a plurality of SaaS applications that are used by the customer of the SMP; receiving, over the network, a request from a client device associated to a given employee of the customer; responsive to the request, then identifying a managerial group within the organization chart of which the given employee is a member, identifying ones of the SaaS applications used by the identified managerial group, and surfacing the identified ones of the SaaS applications in a user interface rendered by the client device as recommended applications for the given employee of the customer.

In some implementations, receiving the HR data includes accessing an application programming interface (API) of an HR SaaS application of which the customer is a subscriber.

In some implementations, the organization chart defines a hierarchical reporting structure of the employees and further defines a plurality of managerial groups of the customer based on the hierarchical reporting structure.

In some implementations, identifying the ones of the SaaS applications used by the group includes using the HR data to identify employees within the group, and determining which SaaS applications are used by employees within the group.

In some implementations, surfacing the identified ones of the SaaS applications is configured to exclude SaaS applications of which the given employee is identified as a user.

In some implementations, identifying the ones of the SaaS applications used by the group includes determining one or more features of the SaaS applications used by employees within the group, and wherein surfacing the identified ones of the SaaS applications is configured to surface the one or more determined features of the SaaS applications.

In some implementations, the user interface includes one or more filters enabling filtering of the identified ones of the SaaS applications according to one or more categorizations.

In some implementations, surfacing the identified ones of the SaaS applications is configured to include one or more license tiers of the identified ones of the SaaS applications.

In some implementations, the user interface is rendered through a browser application executed by the client device.

In some implementations, the user interface further enables submission of a request for a selected one of the identified ones of the SaaS applications, the request configured to trigger provisioning the given employee or to trigger sending of a message for approval.

In some implementations, the HR data identifies a role of the given employee, and wherein the identified ones of the SaaS applications are identified based on the role of the given employee.

In some implementations, a method implemented in a Software as a Service (SaaS) management platform (SMP) is provided, the SMP implemented in a cloud resource having at least one processor and at least one storage device, the method including the following operations: receiving, over a network, human resources (HR) data from an HR application, said HR data describing an organization chart of employees of a customer of the SMP, the HR data identifying a role of the given employee; identifying a plurality of SaaS applications that are used by the customer of the SMP; receiving, over the network, a request from a client device associated to a given employee of the customer; responsive to the request, then identifying a managerial group within the organization chart of which the given employee is a member, identifying ones of the SaaS applications used by the identified managerial group, and surfacing the identified ones of the SaaS applications in a user interface rendered by the client device as recommended applications for the given employee of the customer; wherein surfacing the identified ones of the SaaS applications is configured to include one or more license tiers of the identified ones of the SaaS applications, the one or more license tiers being identified based on the role of the given employee.

In some implementations, receiving the HR data includes accessing an application programming interface (API) of an HR SaaS application of which the customer is a subscriber.

In some implementations, the organization chart defines a hierarchical reporting structure of the employees and further defines a plurality of managerial groups of the customer based on the hierarchical reporting structure.

In some implementations, identifying the ones of the SaaS applications used by the group includes using the HR data to identify employees within the group, and determining which SaaS applications are used by employees within the group.

In some implementations, surfacing the identified ones of the SaaS applications is configured to exclude SaaS applications of which the given employee is identified as a user.

In some implementations, identifying the ones of the SaaS applications used by the group includes determining one or more features of the SaaS applications used by employees within the group, and wherein surfacing the identified ones of the SaaS applications is configured to surface the one or more determined features of the SaaS applications.

In some implementations, the user interface includes one or more filters enabling filtering of the identified ones of the SaaS applications according to one or more categorizations.

In some implementations, the user interface is rendered through a browser application executed by the client device.

In some implementations, the user interface further enables submission of a request for a selected one of the identified ones of the SaaS applications, the request configured to trigger provisioning the given employee or to trigger sending of a message for approval.

In some implementations, methods for providing an administrator interface for SaaS app approval settings are provided. For example, in some implementations, a method implemented in a Software as a Service (SaaS) management platform (SMP) is provided, the SMP implemented in a cloud resource having at least one processor and at least one storage device, the method including the following operations: identifying a plurality of SaaS applications that are used by the customer of the SMP; receiving, over a network, human resources (HR) data from an HR application, said HR data describing an organization chart of users that are employees of a customer of the SMP; providing, over a network, an administrator interface for rendering through a client device operated by an administrative user of the customer of the SMP; receiving input from the client device via the administrator interface, said input identifying a given SaaS application and a managerial group within the organization chart; and responsive to receiving said input, then storing an approval setting for the managerial group for the given SaaS application, the approval setting determines whether a user within the managerial group requires approval to enable granting of a license to use the given SaaS application.

In some implementations, receiving the HR data includes accessing an application programming interface (API) of an HR SaaS application of which the customer is a subscriber.

In some implementations, the organization chart defines a hierarchical reporting structure of the employees and further defines a plurality of managerial groups of the customer based on the hierarchical reporting structure.

In some implementations, when the approval setting defines that a user within the managerial group does not require approval, then a request from a user within the managerial group to use the given SaaS application triggers automatic provisioning of the user for the given SaaS application.

In some implementations, the automatic provisioning of the user includes triggering a single sign-on (SSO) service to provision the user for the given SaaS application.

In some implementations, the approval setting defines that a user within the managerial group requires approval, and wherein the input further identifies an approver for users within the managerial group that request to use the given SaaS application.

In some implementations, a request from a user within the managerial group to use the given SaaS application triggers automatic sending of a message to the approver.

In some implementations, the message to the approver is configured to provide a response mechanism for enabling the approver to indicate a response to the request from the user.

In some implementations, the input further identifies a second approver for the users within the managerial group that request to use the given SaaS application, and wherein the request from the user to use the given SaaS application triggers automatic sending of a message to the second approver upon triggering of the response mechanism indicating approval of the request by the approver.

In some implementations, the received input from the client device further identifies a location, country or geolocation, and wherein the approval setting further determines whether a user at the location, country, or geolocation requires approval to enable granting of a license to use the given SaaS application.

In some implementations, a method implemented in a Software as a Service (SaaS) management platform (SMP) is provided, the SMP implemented in a cloud resource having at least one processor and at least one storage device, the method including the following operations: identifying a plurality of SaaS applications that are used by the customer of the SMP; receiving, over a network, human resources (HR) data from an HR application, said HR data identifying a plurality of locations of users that are employees of a customer of the SMP; providing, over a network, an administrator interface for rendering through a client device operated by an administrative user of a customer of the SMP; receiving input from the client device via the administrator interface, said input identifying a given SaaS application and a given location that is one of the plurality of locations; and responsive to receiving said input, then storing an approval setting for the given location for the given SaaS application, the approval setting determines whether a user at the given location requires approval to enable granting of a license to use the given SaaS application.

In some implementations, receiving the HR data includes accessing an application programming interface (API) of an HR SaaS application of which the customer is a subscriber.

In some implementations, the locations define one or more of a city, country or geolocation.

In some implementations, when the approval setting defines that a user at the given location does not require approval, then a request from a user at the given location to use the given SaaS application triggers automatic provisioning of the user for the given SaaS application.

In some implementations, the automatic provisioning of the user includes triggering a single sign-on (SSO) service to provision the user for the given SaaS application.

In some implementations, the approval setting defines that a user at the given location requires approval, and wherein the input further identifies an approver for users at the given location that request to use the given SaaS application.

In some implementations, a request from a user at the given location to use the given SaaS application triggers automatic sending of a message to the approver.

In some implementations, the message to the approver is configured to provide a response mechanism for enabling the approver to indicate a response to the request from the user.

In some implementations, the input further identifies a second approver for the users at the given location that request to use the given SaaS application, and wherein the request from the user to use the given SaaS application triggers automatic sending of a message to the second approver upon triggering of the response mechanism indicating approval of the request by the approver.

In some implementations, the organization chart defines a hierarchical reporting structure of the employees and further defines a plurality of managerial groups of the customer based on the hierarchical reporting structure, and wherein the input from the client device further defines a given managerial group, and wherein the approval setting is stored for the given managerial group.

In some implementations, methods for automated approval and provisioning via an SSO are provided. For example, in some implementations, a method implemented in a Software as a Service (SaaS) management platform (SMP) is provided, the SMP implemented in a cloud resource having at least one processor and at least one storage device, the method including the following operations: providing, over a network, a user interface for rendering by a client device to an employee of a customer of the SMP; receiving, over the network, input from the client device via the user interface, said input identifying a request by the employee for a SaaS application that is one of a portfolio of SaaS applications used by the customer and managed by the SMP; accessing an approval setting stored in association with the SaaS application, the approval setting configured to authorize automated approval of the employee for the SaaS application; responsive to receiving the input, and based on the approval setting, then triggering a single sign-on (SSO) service to provision the employee as a user of the SaaS application.

In some implementations, triggering the SSO service includes accessing an API of the SSO.

In some implementations, triggering the SSO service is configured to add the employee to a user group defined by the SSO as having access to the SaaS application.

In some implementations, the approval setting is defined for a team of which the employee is a member, the approval setting identifying the team as approved for the SaaS application.

In some implementations, accessing the approval setting includes identifying the team of which the employee is a member.

In some implementations, the user interface is rendered through a browser application executed by the client device.

In some implementations, methods for automated approval and ticketing are provided. For example, in some implementations, a method implemented in a Software as a Service (SaaS) management platform (SMP) is provided, the SMP implemented in a cloud resource having at least one processor and at least one storage device, the method including the following operations: providing, over a network, a user interface for rendering by a client device to an employee of a customer of the SMP; receiving, over the network, input from the client device via the user interface, said input identifying a request by the employee for a SaaS application that is one of a portfolio of SaaS applications used by the customer and managed by the SMP; accessing an approval setting stored in association with the SaaS application, the approval setting configured to authorize automated approval of the employee for the SaaS application; responsive to receiving the input, and based on the approval setting, then triggering a ticketing service to generate a service ticket for provisioning the employee as a user of the SaaS application.

In some implementations, triggering the ticketing service includes accessing an API of the ticketing service.

In some implementations, the approval setting is defined for a team of which the employee is a member, the approval setting identifying the team as approved for the SaaS application.

In some implementations, accessing the approval setting includes identifying the team of which the employee is a member.

In some implementations, the user interface is rendered through a browser application executed by the client device.

In some implementations, methods for automated messaging to an approver in response to an app request are provided. For example, in some implementations, a method implemented in a Software as a Service (SaaS) management platform (SMP) is provided, the SMP implemented in a cloud resource having at least one processor and at least one storage device, the method including the following operations: providing, over a network, a user interface for rendering by a client device to an employee of a customer of the SMP; receiving, over the network, input from the client device via the user interface, said input identifying a request by the employee for a SaaS application that is one of a portfolio of SaaS applications used by the customer and managed by the SMP; accessing an approval setting stored in association with the SaaS application, the approval setting configured to require approval of the employee for the SaaS application; responsive to receiving the input, and based on the approval setting, then triggering sending of a message to an approver, the message including an approval mechanism to indicate approval of the request for the SaaS application.

In some implementations, the method further includes: responsive to triggering of the approval mechanism in the message, then triggering a single sign-on (SSO) service to provision the employee as a user of the SaaS application.

In some implementations, further responsive to triggering of the approval mechanism, a notification is sent to the employee by the SMP.

In some implementations, the method further includes: responsive to triggering of the approval mechanism in the message, then triggering a ticketing service to generate a service ticket for provisioning the employee as a user of the SaaS application.

In some implementations, further responsive to triggering of the approval mechanism, a notification is sent to the employee by the SMP.

In some implementations, the approval mechanism is defined by a button that is selectable to indicate approval of the request for the SaaS application.

In some implementations, the message further includes a disapproval mechanism to indicate disapproval of the request for the SaaS application.

In some implementations, selection of the disapproval mechanism triggers display of a comments field for entry of text.

In some implementations, the message to the approver is sent via email or a messaging application.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 5 illustrates an interface for choosing apps for inclusion in an app store of an SMP, in accordance with implementations of the disclosure.

FIG. 7 illustrates an interface for setting approval rules for an app request, in accordance with implementations of the disclosure.

DETAILED DESCRIPTION

Figure 1:
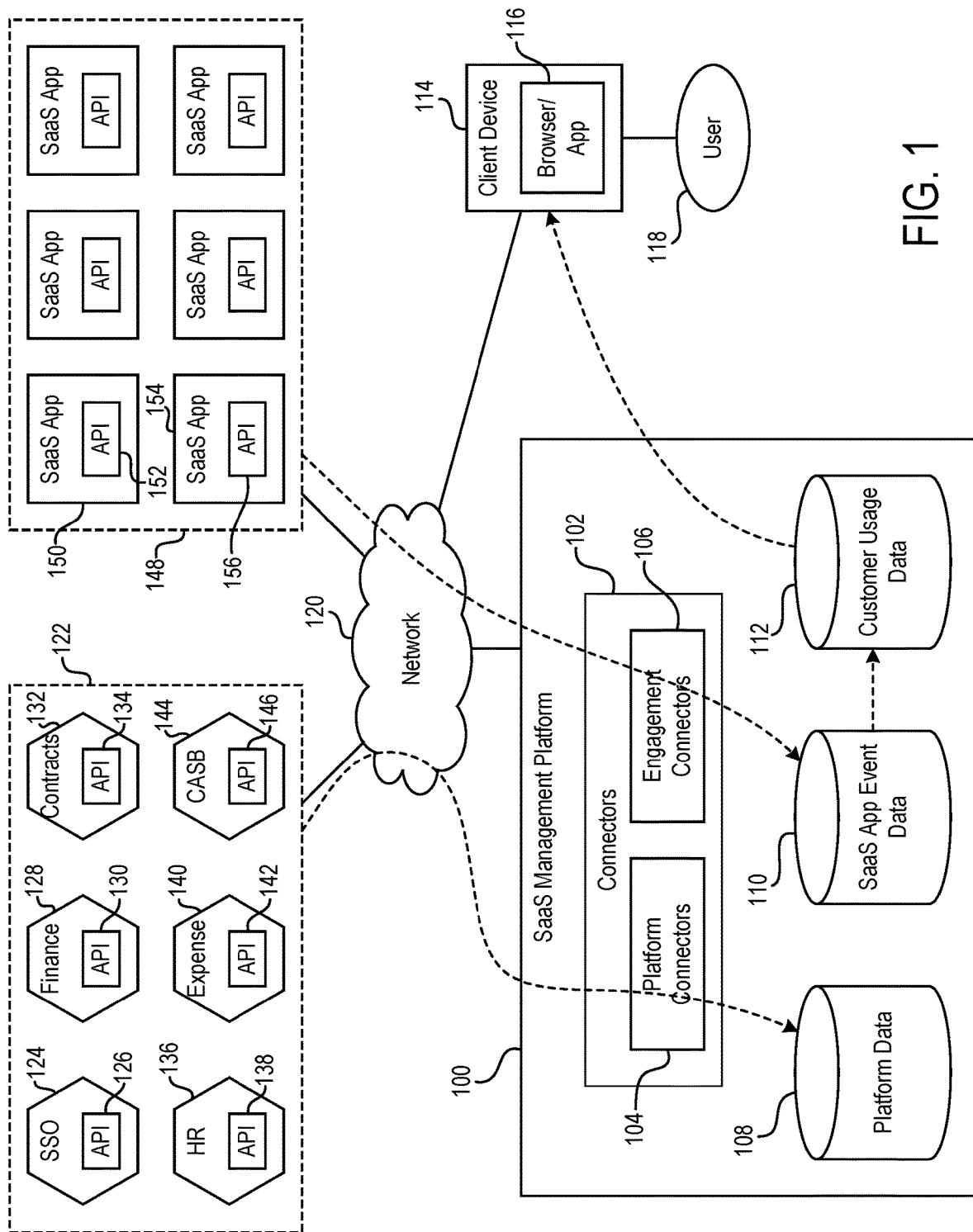
FIG. 1 conceptually illustrates a SaaS management platform and its connection to SaaS applications, in accordance with implementations of the disclosure.

The following implementations of the present disclosure provide methods and systems relating to SaaS application recommendation, approval, and fulfillment in a SaaS management platform.

It will be obvious, however, to one skilled in the art, that the present disclosure may be practiced without some or all of the specific details presently described. In other instances, well-known process operations have not been described in detail in order not to obscure the present disclosure.

Many companies have very scattered applications, such that many users don't always know which applications are available to them and which applications would be useful based on their individual roles. As a result, users might individually purchase additional tools, unknowingly contributing to shadow IT (information technology), in which employee technology is not managed or known to the company's IT group. Furthermore, users might not be set up for success because they lack the appropriate combination of applications that best enable their job functions.

In some situations, the user may identify the application that they want, but require approval. Existing approval processes tend to be inefficient and slow, typically requiring manual routing of approval requests based on the requestor or who needs to approve the request. There can be unfamiliar tools for approvers, and all of this results in slow execution of the approval process.

Furthermore, even after approval of a request for an application has occurred, there is a significant amount of manual effort required to provision the approved user for the application. Many IT hours are spent on license provisioning, and creation of a robust audit trail is also challenging.

To address these challenges, implementations of the present disclosure are drawn to systems and methods providing an employee-centric app fulfillment process for a customer of a SaaS management platform. The solutions implemented herein streamline the app fulfillment process for employees of a given customer organization, from app discovery to provisioning, thereby improving employee productivity, increasing app adoption, and speeding up fulfillment. Implementations provided herein enable information technology (IT) personnel to guide employees with personalized app and license recommendations through a single interface, providing employees with quicker access to the tools they need. Further, by removing the manual burdens of app fulfillment, IT is able to deliver a frictionless and engaging employee experience with significantly less effort.

Implementations of the present disclosure are implemented using a SaaS management platform (SMP). Broadly speaking, a SaaS management platform connects to, and obtains data from, a given customer's portfolio of SaaS applications, and provides analysis and insights relating to the customer's usage of their SaaS applications. One example of a SaaS management platform is Productiv™ provided by Productiv, Inc. For a fuller understanding of the present disclosure, an example of a SaaS management platform is herein described.

FIG. 1 conceptually illustrates a SaaS management platform and its connection to SaaS applications, in accordance with implementations of the disclosure.

In the illustrated implementation, a SaaS management platform 100 includes connectors 102 that are configured to obtain data from various applications/platforms, typically by calling their exposed Application Programming Interfaces (APIs). Connectors 102 are further distinguished between platform connectors 104 and engagement connectors 106.

Platform connectors 104 are configured to obtain data from platform applications/services 122. Broadly speaking, platform applications 122 provide contextual information to identify, enable access, and understand customer usage context of the SaaS applications which the customer is seeking to manage via the SMP 100. It will be appreciated that platform applications may themselves be SaaS applications, but are distinguished from other SaaS applications in the present disclosure as they are used to provide information about the customer that is used as a contextual basis for understanding SaaS application usage. In some implementations, a given platform application/service may be installed on-premise at the customer organization/entity. Examples of platform applications 122 include a single sign-on (SSO) service 124, a human resources (HR) management system 136, a finance application 128, an expense application 140, a contracts management application 132, and a networking service 144 (e.g. cloud access security broker (CASB)).

In some implementations, the SSO service 124 exposes an API 126, and a corresponding one of the platform connectors for the SSO service 124 is configured to obtain data from the SSO service using the API 126. A list of SSO-enabled applications can be obtained, as well as user login activity for each application, thereby providing broad visibility into the customer's SaaS application portfolio. By way of example without limitation, examples of SSO services include Okta™, Azure Active Directory™, Duo Security™, Idaptive™, OneLogin™ PingOne™, and Google Workspace™).

In some implementations, the HR management system 136 exposes an API 138, and a corresponding one of the platform connectors for the HR management system 136 is configured to obtain data from the HR management system 136 using the API 138. The customer's org chart data can be obtained from the HR management system 136, identifying the reporting structure and various organizational groups within the customer organization. Org chart data can be useful in enabling understanding of SaaS application usage and trends and distinguishing how they vary by team, location, and manager. Examples of HR management systems include Workday™, OneLogin™, Okta™, Azure Active Directory™, and Google Workspace™).

In some implementations, the finance application 128 exposes an API 130, and a corresponding one of the platform connectors for the finance application 128 is configured to obtain data from the finance application using the API 130. Payments data from the finance application 128 can be useful for discovering SaaS applications that are not otherwise known, and may not be managed by the customer's information technology (IT) department. Examples of finance application 128 include ERP systems such as Netsuite™ and Oracle™).

In some implementations, the expense application 140 exposes an API 142, and a corresponding one of the platform connectors for the expense application 140 is configured to obtain data from the expense application using the API 142. As with the payments data noted above, expense data from the expense application can also be useful for discovering SaaS applications that are not otherwise known, and may not be managed by the customer's information technology (IT) department. Examples of expense application 140 include Concur™ and Expensify™

In some implementations, the contracts management application 132 exposes an API 134, and a corresponding one of the platform connectors for the contracts management application 132 is configured to obtain data from the contracts management application using the API 134. Contracts data can be used to provide visibility into license levels and contract spend, enabling recommendations for rightsizing and renewing licenses, as well as reclaiming unused licenses. Examples of contract management applications include Coupa™ and Ironclad™).

In some implementations, the networking service 144 exposes an API 146, and a corresponding one of the platform connectors for the networking service 144 is configured to obtain data from the networking service using the API 146. In some implementations, the networking service 144 is defined by a cloud access security broker (CASB) or other service/application that serves as a security enforcement point between the customer organization/entity and its SaaS applications or other cloud services. Data obtained from the networking service 144 provides another source for discovering applications through user logins and use over network activity.

It will be appreciated that the platform connectors 104 can be configured to automatically update data over time, for example, periodically pulling data from the relevant sources. In this manner, customer-specific contextual data for understanding SaaS application usage is continually maintained and tracks the current state of the customer organization. The data obtained from the customer's platform applications 122 is stored in the SMP 100 as platform data 108. While platform connectors 104 enable automatic retrieval of data directly from the customer's platform applications/services, it will be appreciated that, in the alternative, a given customer may upload their platform application data to the SMP 100.

The engagement connectors 106 are configured to obtain data pertaining to usage of the customer's SaaS application portfolio 148. For example, a given SaaS application 150 may expose an API 152, and a corresponding one of the engagement connectors 106 for the SaaS application 150 is configured to call the API 152 to obtain data describing events that occurred through customer usage of the SaaS application 150. Likewise, a given SaaS application 154 may expose an API 156, and a corresponding one of the engagement connectors 106 for the SaaS application 154 is configured to call the API 156 to obtain data describing events that occurred through customer usage of the SaaS application 154. It will be appreciated that there can be many SaaS applications in the customer's SaaS application portfolio 148, and each may expose an API that is called by a corresponding engagement connector to obtain data describing events occurring through usage of the applications. Such data is stored in the SMP 100 as SaaS app event data 110.

As described in further detail below, the SaaS app event data 110 is processed and analyzed to determine various aggregations and information describing the customer's usage of their SaaS application portfolio 148, which is stored as customer usage data 112. Such usage data can be accessed for viewing via a client device 114 operated by a user 118 (e.g. an employee of the customer organization viewing the usage data of the customer organization). By way of example without limitation, examples of client devices include personal computers, laptops, tablets, cellular phones, mobile devices, etc. In some implementations, the SMP 100 is accessed via a browser or application executed by the client device 114, and the customer usage data 112 is provided for viewing through the browser/application.

In the present disclosure the terms "application" and "app" are used interchangeably. Generally, an "app" refers to a SaaS application that is capable of being managed through the SMP.

Figure 2A:
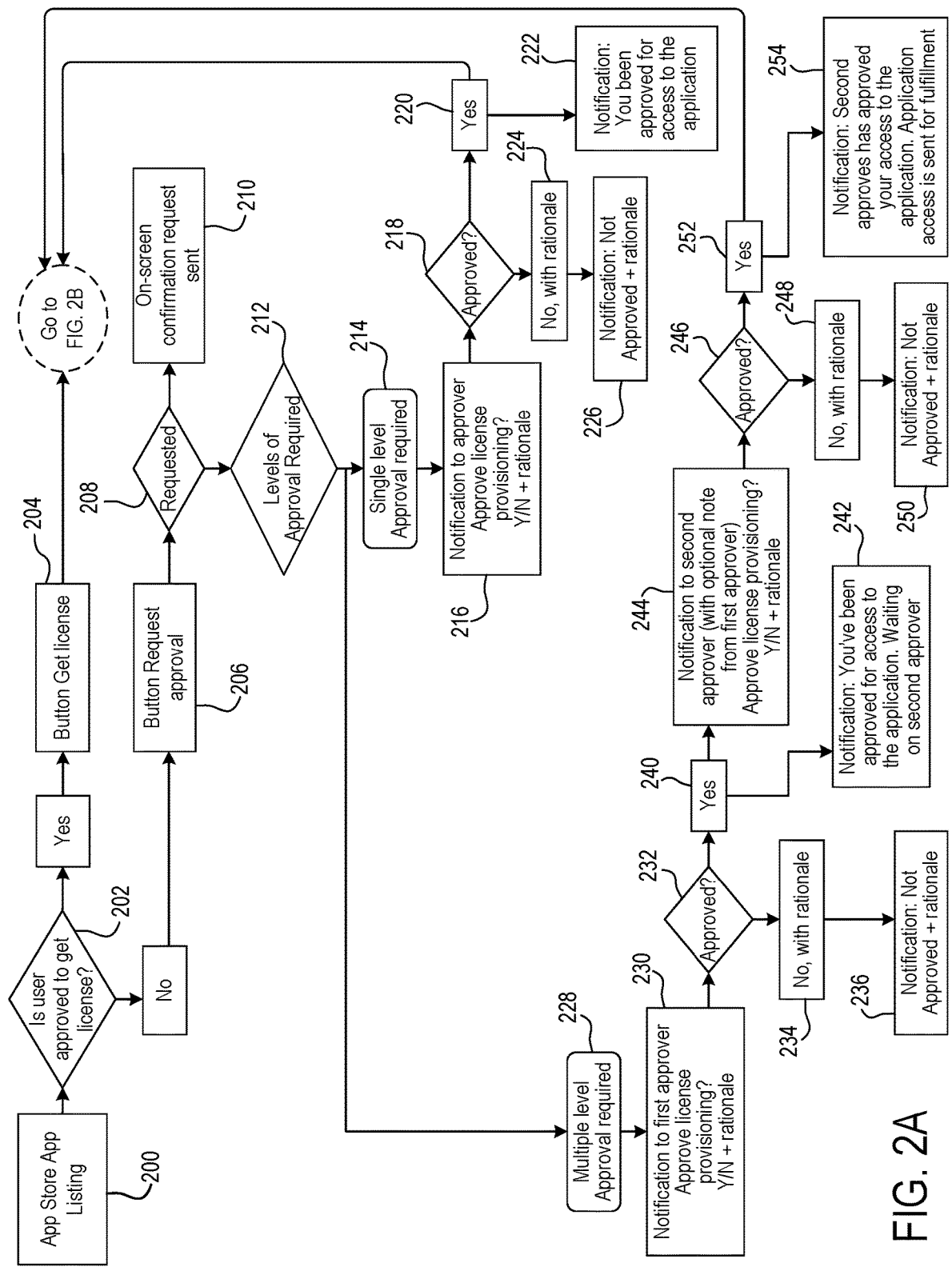
FIG. 2A and FIG. 2B conceptually illustrate a process implemented in an SMP, for enabling approval and provisioning of a user for a SaaS application requested through an app store listing provided by the SMP, in accordance with implementations of the disclosure.
Figure 2B:
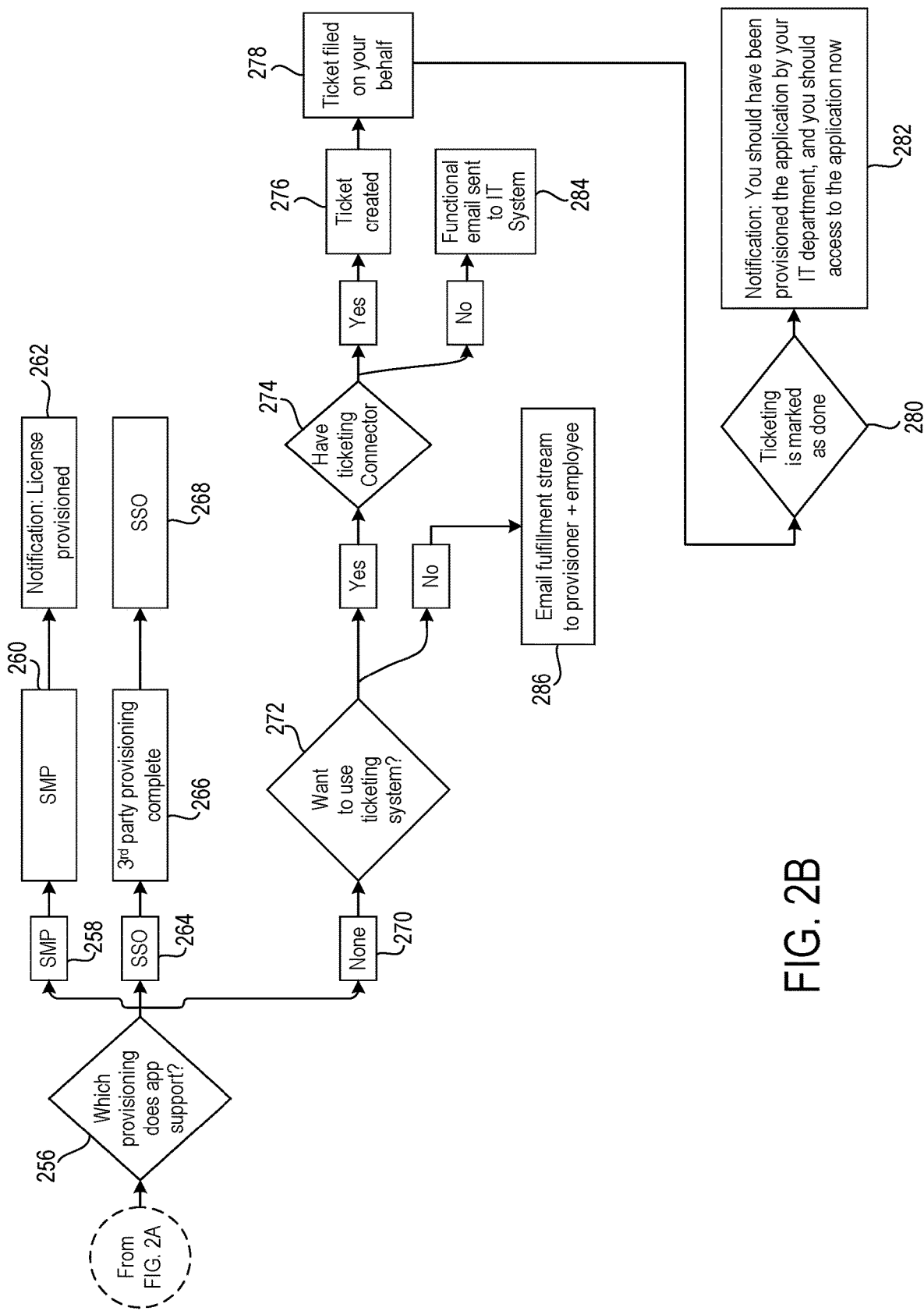

FIG. 2A and FIG. 2B conceptually illustrate a process implemented in an SMP, for enabling approval and provisioning of a user for a SaaS application requested through an app store listing provided by the SMP, in accordance with implementations of the disclosure.

At method operation 200, an app listing is provided through an app store provided by the SMP. Broadly speaking, the app store is an Internet-accessible property providing a user interface (UI) to enable app discovery, approval, and automated app fulfillment features for users (e.g. employees, contractors, etc.) associated to a customer of the SMP. In some implementations, the app store is rendered through a browser application executed by a client device. In other implementations, the app store is provided through a mobile device application, or other system capable of accessing the SMP and rendering a user interface.

The app listing provided through the app store's user interface can be configured to provide recommendations, featured apps, filtering of apps (e.g. by team or managerial group), or other intelligent surfacing of apps to the user. That is, the app listing can be tailored to the user based on various factors and characteristics of the user, so as to surface particular apps that are likely to be useful for the user.

At method operation 202, for a given app, it is determined whether the user is preapproved to obtain a license for the app. It will be appreciated that in some implementations, certain users can be preapproved for a given app, such that the users do not need to obtain separate approval from another user in order to obtain a license for the app. For example, in some implementations, users that are members of a specified team or managerial group within the customer organization can be preapproved for the app.

In some implementations, options provided to the user depend upon whether or not the user is preapproved. For example, if the user is preapproved for the app, then at method operation 204, a button (or other input mechanism) to get a license for the app is provided in the user interface, and triggering of the button automatically triggers a fulfillment process, as described with reference to FIG. 2. Whereas if the user is not preapproved for the app, then at method operation 206, a button (or other input mechanism) to request approval is provided in the user interface.

Upon triggering of the button to request approval, then at method operation 208 the request for the app is logged, and at method operation 210 an on-screen confirmation is provided to the user indicating that their request for the app has been sent. At method operation 212, the levels of approval required for the user and the requested app is determined.

If it is determined that a single level of approval is required at method operation 214, then at method operation 216, a notification to the approver is sent. It will be appreciated that the notification can be configured to indicate that the user is requesting the app, and ask the approver whether they approve of the request, and if not, to provide a rationale for denying the request. In various implementations, the notification to the approver is provided via email or another messaging or notification system. In some implementations, the notification can include input mechanisms such as selectable buttons or links to indicate yes or no responses, or provide a link to a webpage where such responses can be entered.

At method operation 218, the approver's response to the notification is received, and if the response is yes (indicating approval) at method operation 220, then at method operation 222, a notification is sent to the requesting user indicating that their request has been approved, and that their application access has been sent for fulfillment; and the process continues to the fulfillment process described at FIG. 2B. However, with continued reference to FIG. 2A, on the other hand, if the approver's response is no (indicating disapproval) at method operation 224, and an accompanying rationale is received for the disapproval of the request, then at method operation 226, a notification is sent to the requesting user indicating that their request was not approved and providing the rationale to the requesting user.

If it is determined that multiple levels of approval are required at method operation 228, then at method operation 230, a notification to the first approver is sent. It will be appreciated that the notification can be configured to indicate that the user is requesting the app, and ask the first approver whether they approve of the request, and if not, to provide a rationale for denying the request. In various implementations, the notification to the first approver is provided via email or another messaging or notification system. In some implementations, the notification to the first approver can include input mechanisms such as selectable buttons or links to indicate yes or no responses, or provide a link to a webpage where such responses can be entered.

At method operation 232, the first approver's response to the notification is received, and if the response is yes (indicating approval) at method operation 240, then at method operation 242, a notification is sent to the requesting user indicating that their request has been approved by the first approver, and that the process is waiting on approval from a second approver. On the other hand, if the first approver's response is no (indicating disapproval) at method operation 234, and an accompanying rationale is received for the disapproval of the request, then at method operation 236, a notification is sent to the requesting user indicating that their request was not approved and providing the rationale to the requesting user.

Further continuing from the yes response of method operation 240, then at method operation 244, a notification to the second approver is sent. It will be appreciated that the notification can be configured to indicate that the user is requesting the app, and ask the second approver whether they approve of the request, and if not, to provide a rationale for denying the request. In various implementations, the notification to the second approver is provided via email or another messaging or notification system. In some implementations, the notification can include input mechanisms such as selectable buttons or links to indicate yes or no responses, or provide a link to a webpage where such responses can be entered.

At method operation 246, the approver's response to the notification is received, and if the response is yes (indicating approval) at method operation 252, then at method operation 254, a notification is sent to the requesting user indicating that their request has been approved by the second approver, and that their application access has been sent for fulfillment; and the process continues to the fulfillment process described at FIG. 2B. However, with continued reference to FIG. 2A, on the other hand, if the second approver's response is no (indicating disapproval) at method operation 248, and an accompanying rationale is received for the disapproval of the request, then at method operation 250, a notification is sent to the requesting user indicating that their request was not approved and providing the rationale to the requesting user.

While the foregoing describes a process for serial approvals by first and second approvers, in other implementations, approval notifications can be sent in parallel (simultaneously) to the approvers, and the process does not proceed to fulfillment of the app request unless both approvers indicate positive approval. Additionally, while a process involving two approvers has been described, it will be appreciated that in other implementations, there can be more than two approvers, using processes similar to that described above.

With reference now to FIG. 2B, a process for fulfillment of an app request continuing from the process of FIG. 2A and in accordance with implementations therewith is described. Following from approval of the user's request for the app, whether automatic or responsive to approval by one or more approvers, then at method operation 256, it is determined which type of provisioning is supported for the requested app. In some implementations, provisioning by the SMP itself is supported by the app, and at method operation 258, the SMP's provisioning logic for the app is activated to perform provisioning of the user for the app. In some implementations, the SMP may access an API of the app to provision the user for the app. At method operation 260, confirmation of completion of the provisioning by the SMP is received, and accordingly at method operation 262, a notification is sent to the user indicating that their license for the app has been provisioned.

In some implementations, provisioning by an SSO is supported by the app, and at method operation 264, the SSO is activated to perform provisioning of the user for the app. In some implementations, the SMP may access an API of the SSO to provision the user for the app. At method operation 266, confirmation of completion of the provisioning by the SSO is received, and accordingly at method operation 268, a notification is sent to the user indicating that they now have access to the app via their SSO, for example, by being added to the relevant access group for the app.

While the above-described provisioning via the SMP or an SSO provide automated provisioning flowing from app approval, in some implementations, as shown at method operation 270 it is determined that automated provisioning is not supported by the app. Then at method operation 272 is determined whether a ticketing system is available to be used for processing the approved request for the app. If yes, then at method operation 274 it is determined whether a ticketing connector is available for accessing a ticketing system. Such a ticketing connector can constitute logic of the SMP that is configured to access an API of the ticketing system to generate tickets. If the ticketing connector is available, then at method operation 276, the ticketing connector is activated to create a ticket through the ticketing system requesting provisioning of the user for the app. At method operation 278, a notification indicating that a ticket was filed is sent to the requesting user. When the ticket is acted upon by the relevant party (e.g. IT personnel), then the user is provisioned for the app and at method operation 280, the ticket is marked as done.

Continuing from method operation 274, if a ticketing connector is not available or the SMP is not otherwise able to directly access the customer's ticketing system, then in some implementations, at method operation 284 a functional email is sent to the customer's IT system, the email being configured to trigger creation of a ticket for fulfillment of the approved app request.

Continuing from method operation 272, if a ticketing system is not to be used, then at method operation 286, an email (or other messaging type) is sent to a provisioner and the requesting user, to initiate a discussion stream between the provisioner and the requesting user regarding fulfillment of the approved requested app.

Figure 3:
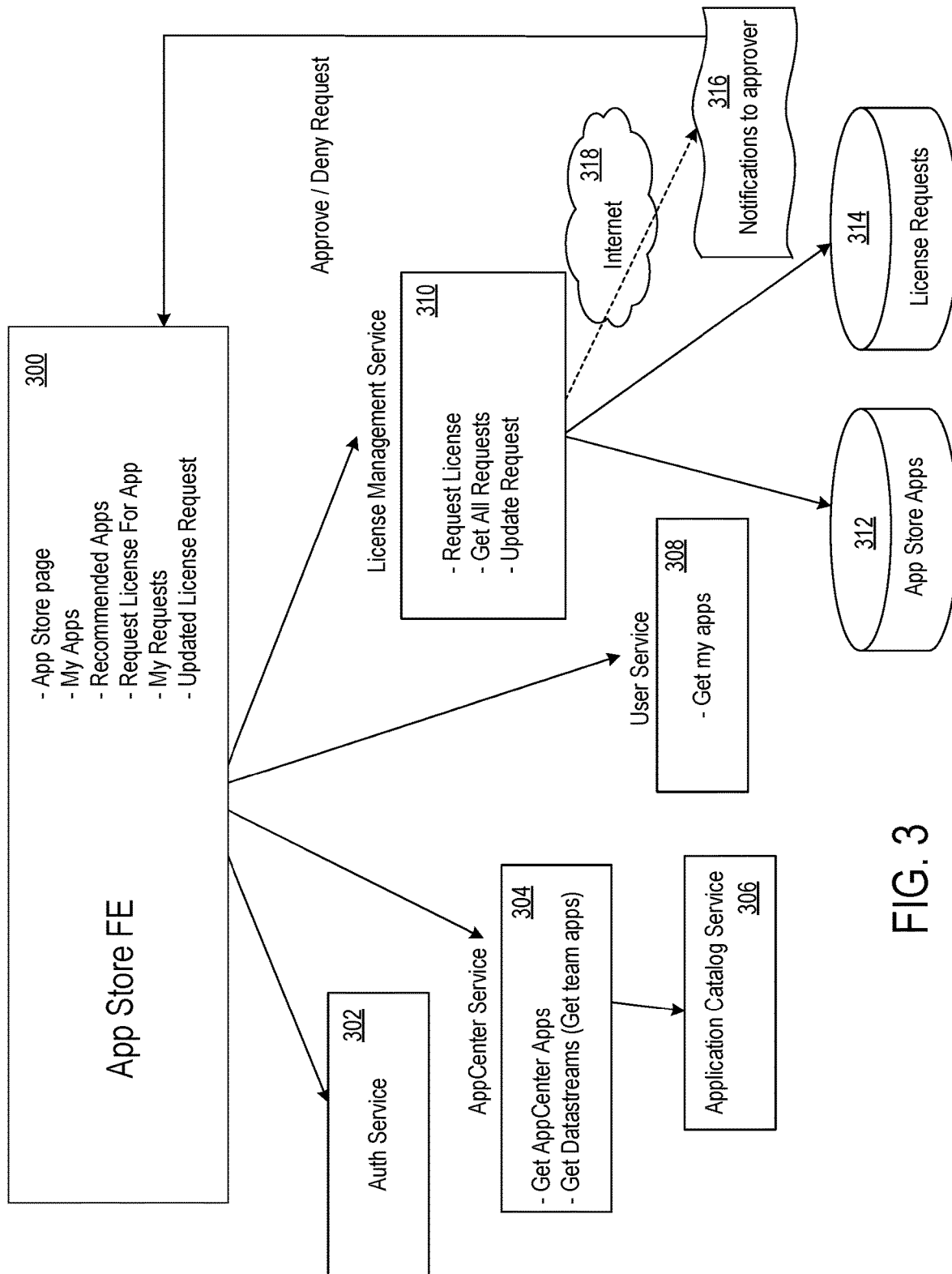
FIG. 3 conceptually illustrates a system implemented in an SMP for providing an app store enabling app discovery, requests, approvals, and fulfillment, in accordance with implementations of the disclosure.

FIG. 3 conceptually illustrates a system implemented in an SMP for providing an app store enabling app discovery, requests, approvals, and fulfillment, in accordance with implementations of the disclosure.

An app store front-end (FE) component 300 interfaces with client devices over a network, such as the Internet 318, providing a user interface presenting the app store, and servicing requests from the client devices. In some implementations, for a given client device, the user interface is rendered by a browser application or other application executed by the client device. By way of example without limitation, the FE component 300 can be configured to provide data to service requests for various features of the app store, such as providing the app store page, providing a listing of the user's apps, providing a listing of recommended apps for the user, requesting a license for an app, providing a listing of the user's requests, and updating license requests. The FE component 300 is configured to call, invoke, or otherwise communicate with various services to enable the provision of the user interface and servicing of requests from the client device.

An authentication service 302 provides for authentication of the user associated to the client device. In some implementations, the authentication service 302 is configured to authenticate the user for access to the SMP, and furthermore specifically authenticate the user for access to the app store. That is, the app store and its related features and content as described herein can be an optional service of the SMP for a given customer. Furthermore, for a given customer that has opted in to the app store service, then access is configurable for a given employee or user of that customer. That is, access to the app store can be configured by an admin user, and may be set to allow or disallow access by one or more users associated with the customer (such as employees, contractors, etc.), or one or more teams, managerial groups, etc.

An appcenter service 304 is configured to obtain non-user specific app-related data, including obtaining listings of apps that are available through the app store, and obtaining various more specific filtered app datastreams, such as the apps used by a specific team or managerial group. To provide such data, a background application catalog service 306 is implemented to maintain a catalog of apps used by each customer of the SMP. It will be appreciated that the application catalog service 306 stores the catalog of apps for a given customer in association with related customer-specific data, such as HR data indicating which teams use which apps (and which features or tiers of such apps), which apps are included and/or featured as set by the customer's admin for the app store, the number of provisioned licenses for a given app, the number of active licenses, an app status (e.g. approved, not approved, supported, not supported, etc.), custom or predefined labels, etc.

A user service 308 is configured to obtain listings of apps and related data that are specific to the user interfacing with the app store. For example, this can include a listing of apps used by the given user and related data about such apps. In some implementations, the apps used by the given user can be used in the user interface of the app store to enable filtering to exclude the apps used by the given user and show apps (e.g. of a group or category such as apps used by the user's team or managerial group) that are not already used by the user. This is one way in which app discovery for the user is facilitated, as the user is able to easily see apps that others within the customer organization and/or their own team are using, which they are missing and may therefore wish to obtain.

In some implementations, recommended apps are surfaced through the app store's user interface based on information obtained by the appcenter service 304 and the user service 308. For example, in some implementations, recommended apps can include apps used by the customer that are designated as featured, but excluding those for which the user is already licensed. In some implementations, recommended apps can include apps used by a team or managerial group to which the user belongs, but excluding those for which the user is already licensed. In some implementations, recommended apps can include apps recently added to the customer's (or team's) app listing (e.g. apps added within a predefined prior time period), but excluding those for which the user is already licensed. In some implementations, recommendations of apps can be configured to highlight a category of app which the user does not already have.

In some implementations, apps are recommended, at least in part, based on the user's existing apps. For example, recommendation logic of the system can be configured to analyze the app portfolios of users within the customer organization and recommend, based on the user's current portfolio of apps, additional apps that other users with a similar portfolio of apps also use. In some implementations, the analysis of app portfolios takes into account characteristics of the users, such as their team, group, department, role, position, title, location (e.g. city, country, region), language, etc. so that the system is configured to recommend apps used by other users with similar characteristics, and optionally, similar app portfolios. In some implementations, the analysis can extend to app portfolios and characteristics of users from other customers of the SMP, such as other customers in a similar market as the current user's customer organization.

Additionally, in some implementations, recommendation logic of the system can be further configured to analyze the specific app configurations within app portfolios of users and in addition to recommending additional apps for a given user as described above, also recommend specific configurations of the recommended apps. For example, this can include recommending which features, parts, or portions of an app, and/or which type of license (e.g. which license tier, package, combo, etc.) to obtain. It will be appreciated that as with the recommendation of the apps themselves, the recommendation of such configurations can also be based on characteristics of the operative user, so that the system is configured to recommend app configurations used by other users with similar characteristics to the operative user. In various implementations, such recommendations may be based on users within the operative user's customer organization only, or additionally be based on users within other customers of the SMP, such as other customers in a similar market as the current user's customer organization.

In some implementations, the recommendation logic uses a machine learning (ML) model (or artificial intelligence (AI)) to generate recommendations of apps. A ML model can be trained to recommend apps in accordance with any of the factors described herein, including recommending apps based on a given user's existing app portfolio, position/team/group/role, etc. In some implementations, the ML model is trained using the app portfolios and characteristics of existing users, to recommend and/or predict apps (and their specific configurations or license tiers) that are likely to be useful to a given user based on their specific app portfolio and user characteristics.

A license management service 310 is configured to handle activity relating to requests for app licenses received through the FE component 300, which may be triggered through the user interface of the app store. The license management service 310 is configured to request licenses for approved apps, or manage or perform the approval process for requested apps that are not yet approved for the specific requesting user. The approval process can include sending notifications 316 to approvers over the network 318, as has been described. For approved apps, requesting licenses can include initiating and carrying out a fulfillment process as described above.

In response to a request received through the FE component 300 to view the user's requests, the license management service 310 is configured to obtain the user's requests from a license requests data storage 314. This can also include obtaining current status information regarding the user's requests, such as the status of an approval process or fulfillment process for a given requested app.

For an outstanding license request, the FE component 300 may receive an update to the license request, such as an approval or denial from an approver, and responsive to such an update, then the license management service 310 is configured to update the license request accordingly, and carry out the next process operation accordingly (e.g. initiating fulfillment, notifying another approver, etc.).

When a license is provisioned for the user for a given app, then an app store apps data storage 312, which contains data regarding apps of the customer, is updated to reflect the user being licensed or provisioned for the given app.

In some implementations, the app store FE component 300 is further configured to provide an administrative user interface (UI) for enabling an administrator to determine settings for the app store, including app selections, app approvals, and app fulfillment settings. It will be appreciated that any of such settings can be more specifically determined for individual teams or groups within the customer organization.

In some implementations, the administrative UI enables configuration of which apps will appear in the app store, and optionally, for which sets of users (e.g. based on HR org chart data, such as teams, groups, etc.). In some implementations, the administrative UI enables designation of apps as "featured," thereby affecting their likelihood to be recommended to users as discussed in the present disclosure. In some implementations, the administrative UI enables designation of apps as approved or supported (e.g. by the IT department). In some implementations, preferred prioritizations of apps can be set, such as setting a priority order of apps to be featured, setting weights or factors for apps for inclusion in recommendations, etc.

In some implementations, inclusion of apps in the app store is driven, at least in part, by the customer's usage of the app. For example, in some implementations, apps having a minimum number of licenses provisioned are automatically included in the app store (or included as a default setting that is customizable), whereas apps with less than the minimum number of licenses provisioned are not automatically included in the app store. In some implementations, usage or engagement metrics monitored by the SMP are considered, so that apps having one or more usage metrics exceeding one or more respective predefined thresholds are automatically (or by default) included in the app store, whereas apps having usage metrics that do not exceed the predefined thresholds are not automatically included in the app store. It will be appreciated that a given usage metric can be defined over a predefined preceding time period (e.g. prior 3 months, 6 months, year, etc.). Examples of usage metrics for a given app can include the number of user logins, number of active users, amount of time spent using the app, amount of use of one or more features of the app, etc.

In some implementations, customer usage as a determinant for inclusion in the app store is further specific to individual teams or groups. Hence, a given team's usage of apps will affect which apps are specifically recommended for members of that team, and thus the recommended apps may differ from team to team.

In some implementations, the administrative UI enables configuration of approval settings for each app. Such approval settings can be set for specific sets of users, such as one or more teams or groups identified from org chart data. It will be appreciated that a given app can be configured with different approval settings for different sets of users. For example, an app can be configured to be automatically approved for one set of users, while being configured to require approval for a different set of users. For apps requiring approval, the administrative UI can further enable defining the approval process steps required, such as identifying which persons are required to provide approval, in what order, and how communications requesting approval are sent.

In some implementations, default approval settings are defined for a given app or a given type of app, which can be further customized. For example, in some implementations, a given app may be configured to require approval by a manager of the requestor, or by the IT department, by default. In other implementations, a given app may be configured to be automatically approved by default. In some implementations, predefined templates defining approval settings are defined, enabling selection of a given template to apply the given template's approval settings to a given app. In some implementations, an ML/AI model is trained to predict approval settings, for example, using approval settings of other apps and characteristics of the other apps. Such an ML model can be used to predict and set default approval settings for a new app added to the customer's portfolio, for example, based on the new app's characteristics.

In some implementations, the administrative UI further enables configuration of fulfillment settings for apps, including defining various methods of carrying out fulfillment as described above. For example, for an app supporting automated provisioning by the SMP, the administrative UI can enable configuration of settings to enable the SMP to access the app to carry out the provisioning, such as identifying a provisioning API of the app for the SMP to access. For an app supporting automated provisioning via SSO, the administrative UI can enable configuration of settings to enable the SMP to access the SSO to carry out the provisioning, such as identifying a provisioning API of the SSO for the SMP to access, identifying access groups corresponding to apps and/or license tiers of the apps, etc.

Figure 4:
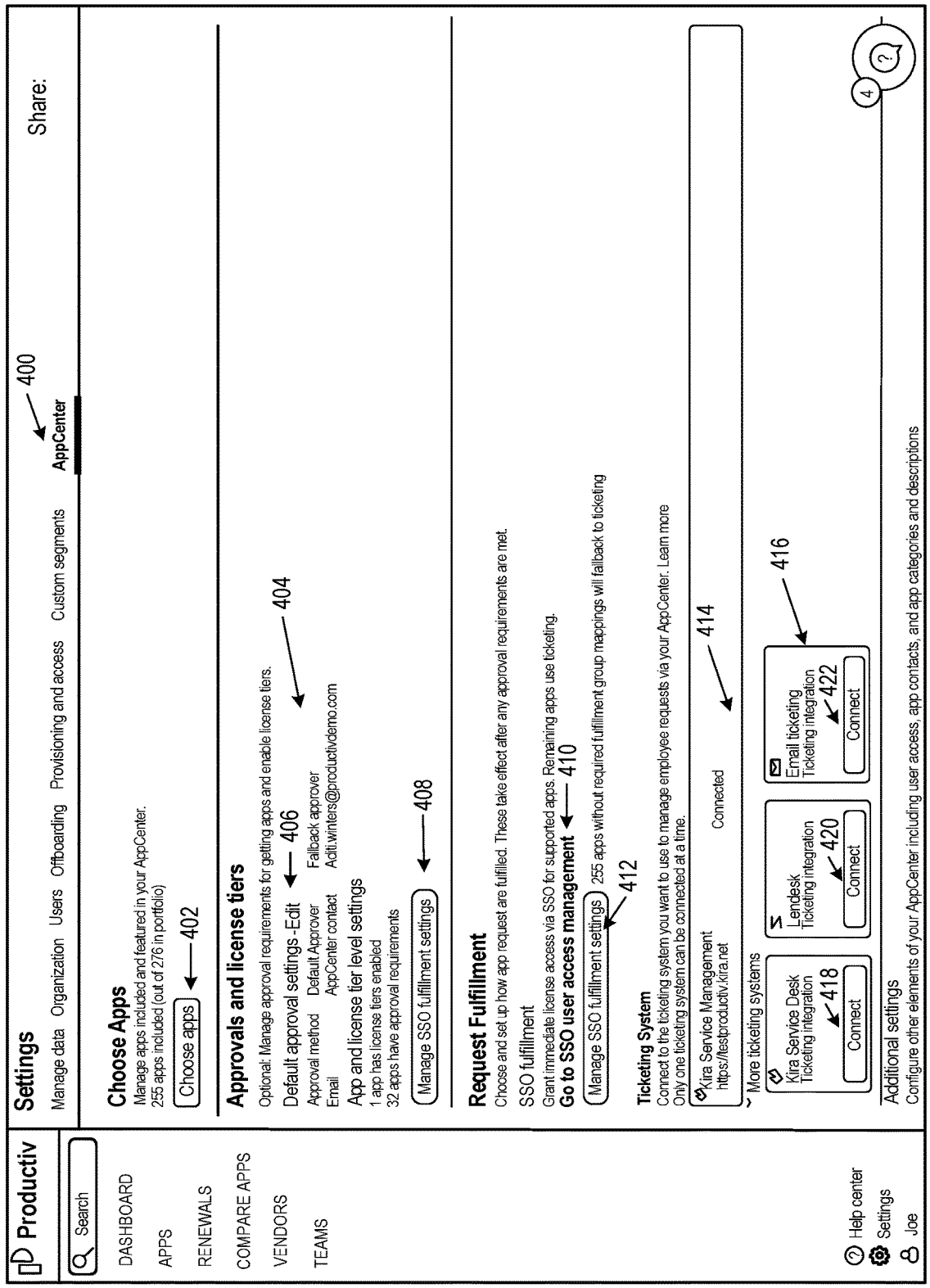
FIG. 4 illustrates an example of an administrative user interface providing access to various settings related to an app store provided by an SMP, in accordance with implementations of the disclosure.

FIG. 4 illustrates an example of an administrative user interface providing access to various settings related to an app store provided by an SMP, in accordance with implementations of the disclosure.

In the illustrated implementation, an "AppCenter" tab 400 of a settings interface for an SMP is shown. The "AppCenter" is one example of an app store of an SMP provided by Productiv, Inc., in accordance with implementations of the disclosure. Through the illustrated interface, various settings for the app store are accessible. For example, a "Choose apps" button 402 is selectable to access an interface enabling selection of which apps are made available through the app store.

At reference 404, default approval settings are shown, including a default approval method (e.g. via email), a default approver, and a fallback approver (e.g. in case the default approver does not respond within a predefined time period or is otherwise unavailable). The default approval settings are editable via an interface that is accessed by selection of the "Edit" link text 406. For more specific app and license tier approval settings, a button 408 is selectable to access an interface enabling management of various license tiers and associated approval settings.

Access to edit settings for fulfillment of app requests is also provided through the illustrated interface. As noted, in some implementations, fulfillment is possible via communication with an SSO. Selection of the link text 410 enables access to an interface for managing SSO user access, so that users with certain SSO access privileges can be granted immediate license access for supported apps. This can entail managing user membership in an SSO group that confers automatic license provisioning for one or more apps supporting SSO provisioning.

A button 412 is selectable to access an interface for managing SSO fulfillment settings. This can include defining settings to enable apps to be provisioned via SSO. In some implementations, fulfillment group mappings can be defined so that a given SSO group is enabled to be automatically provisioned for a given app. In some implementations, in the absence of fulfillment group mappings, then app fulfillment will fallback to ticketing.

A ticketing system can be connected to the SMP to enable app requests to be handling via the ticketing system. By way of example without limitation, at reference 414 a connected ticketing system is identified. At reference 416, additional ticketing or communication systems are identified for connection, and buttons 418, 420, and 422 are selectable to access interfaces for connecting the additional ticketing systems.

FIG. 5 illustrates an interface for choosing apps for inclusion in an app store of an SMP, in accordance with implementations of the disclosure.

In the illustrated implementation, a listing of apps is shown, which can be configured for inclusion in the app store. At column 500, the names of the apps are displayed. At column 502, the categorizations of the apps are shown. At column 504, a checkbox for each app is selectable or deselectable to determine whether the app will be included in the app store or excluded from the app store, respectively. At column 506, a checkbox is selectable to set a given app to be a featured app, so that it will be prioritized for recommendation or when otherwise appropriate (e.g. prioritized when a user views a category of apps which includes the featured app).

At column 508, a status setting of the apps is shown, such as approved or non-approved. At column 510, the number of active licenses is shown. At column 512, the number of provisioned licenses is shown. And at column 514, labels associated to the apps are shown.

Figure 6:
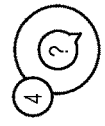
FIG. 6 illustrates an interface for managing approvals and license tiers of apps in an app store of an SMP, in accordance with implementations of the disclosure.

FIG. 6 illustrates an interface for managing approvals and license tiers of apps in an app store of an SMP, in accordance with implementations of the disclosure.

In the illustrated implementation, a listing of apps and license tiers is shown, for which approval requirements for the apps and/or app license tiers can be set. At column 600, app names and license tiers are shown. At column 602, checkboxes are provided which are selectable to enable license tiers for a given app. At column 604, checkboxes are provided which are selectable to determine whether approval is required for a given app or license tier.

As shown by the selected checkbox 606, the "Pro" license tier of the app is thereby configured to require approval, and accordingly a default approver is listed. The "Edit" link text 608 is selectable to access an interface for editing the approver and/or the approvals required.

Figure 7:
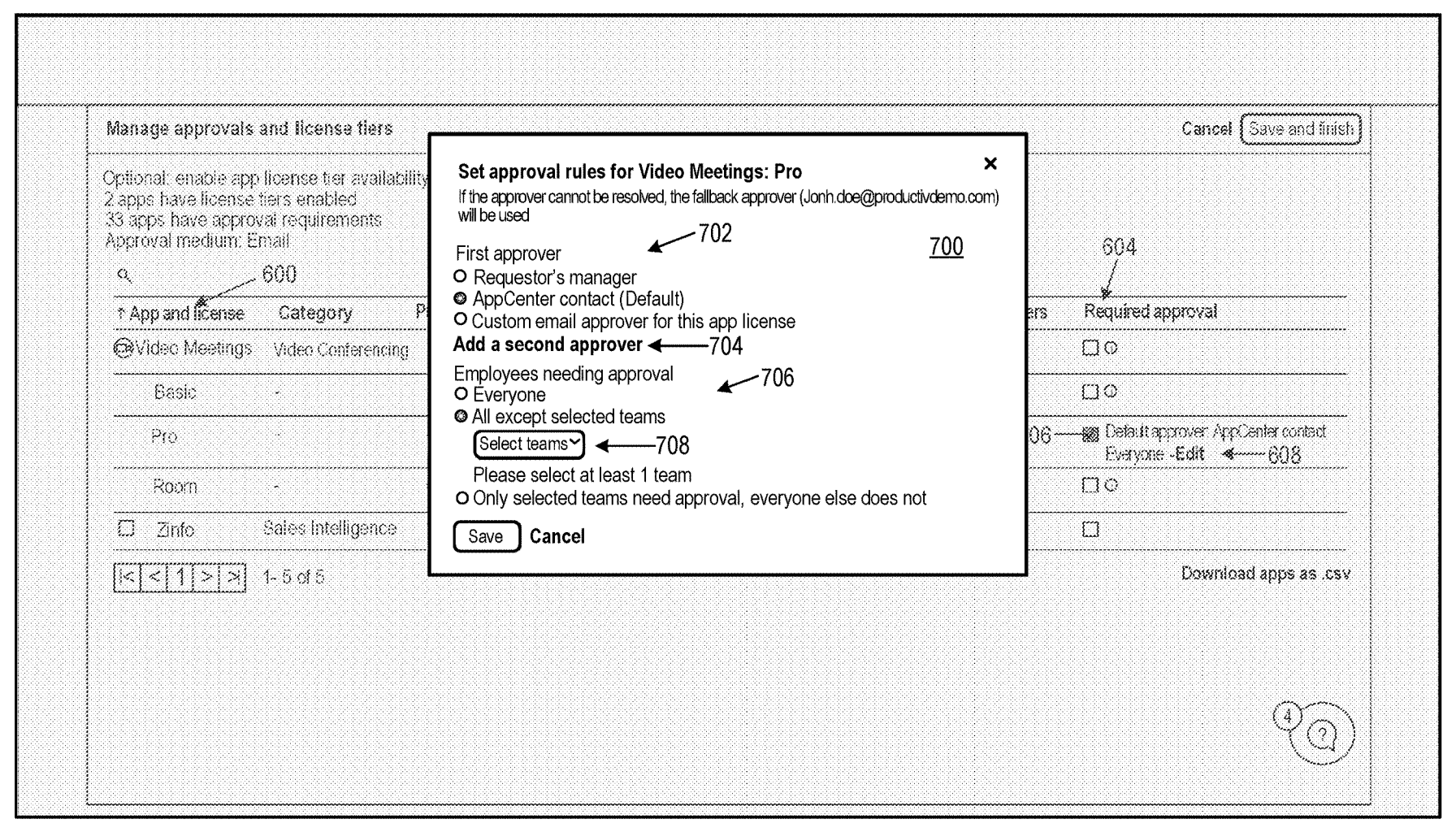

FIG. 7 illustrates an interface for setting approval rules for an app request, in accordance with implementations of the disclosure.

The illustrated interface is defined in a pop-up window 700 that is displayed in response to selection of the "Edit" link text 608 described above. At reference 702, a first approver can be selected from a plurality of options, such as the requestor's manager, the designated "AppCenter" contact, or a custom-defined e-mail approver for the instant app license.

Link text 704 is selectable to enable addition of a second approver.

At reference 706, the employees needing approval can be defined. Options in this regard include everyone, all except selected teams, or only selected teams (with everyone else not needing approval). In the illustrated implementation, the radio button for all employees needing approval except for selected teams is selected, and accordingly, a team drop-down menu selector 708 is configured to enable selection of which teams will not require approval to obtain a license for the current app.

Figure 8:
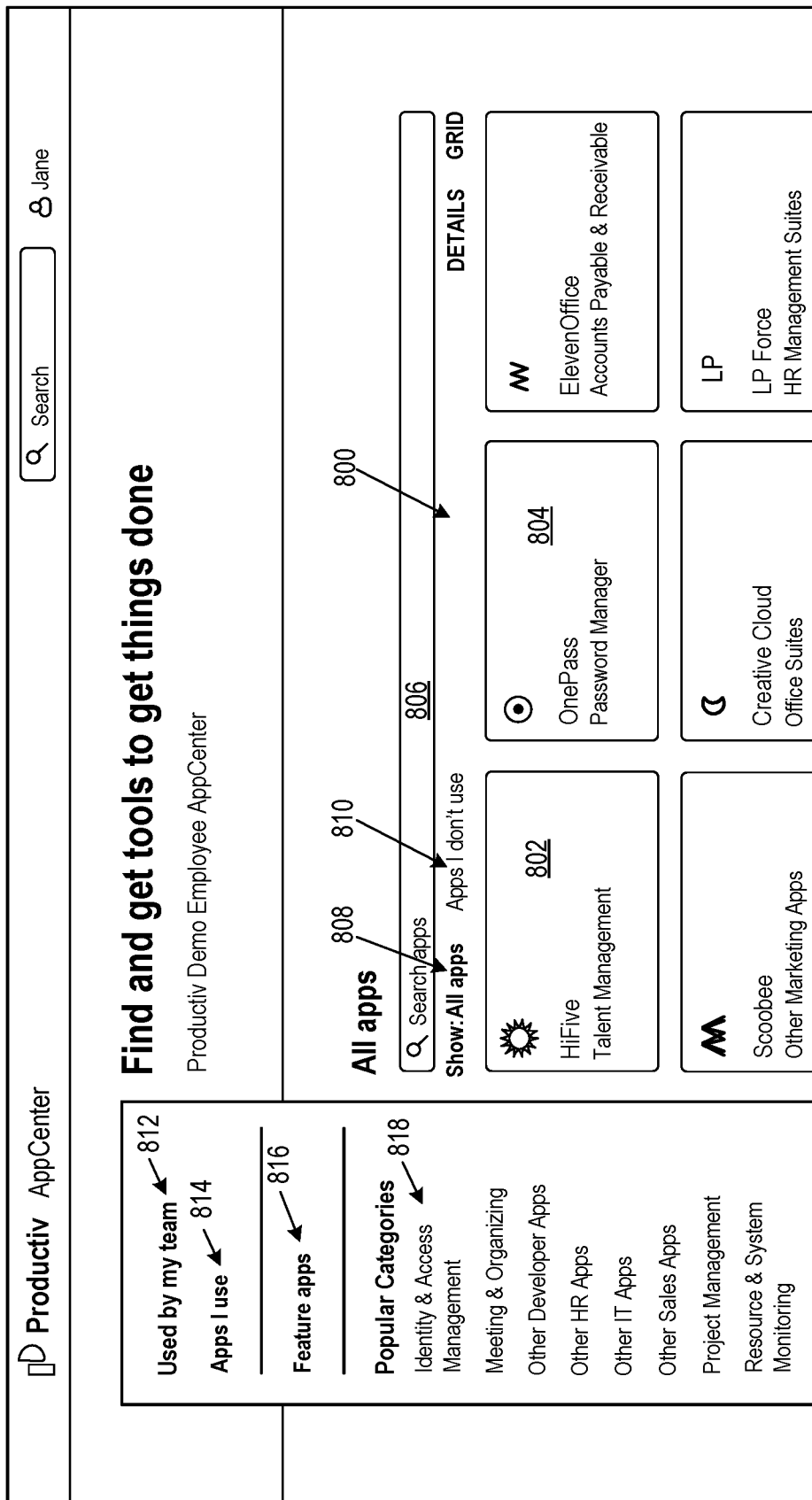
FIG. 8 illustrates an interface for an app store of an SMP, in accordance with implementations of the disclosure.

FIG. 8 illustrates an interface for an app store of an SMP, in accordance with implementations of the disclosure.

Broadly speaking, the illustrated interface provides for viewing of apps that are managed through the SMP, enabling viewing of a specific user's apps, and facilitating app discovery through customized viewing of apps. In the app listing region 800 of the interface, a number of apps are represented by tiles, such as the tiles 802 and 804 for example, including information about the apps. It will be appreciated that the apps shown in the region 800 can be tailored, filtered, or otherwise customized in various ways, including for purposes of recommendation as described in the present disclosure.

For example, an "All apps" option 808 is selectable to show all apps available to the user. An "Apps I don't use" option 810 is selectable to show apps that the user does not currently use. A search field 806 is provided for entry of text to enable searching amongst the available apps.

A "Used by my team" option 812 is selectable to provide viewing of apps that are used by the user's team or group. An "Apps I use" option 814 is selectable to provide viewing of apps that are currently used by the user.

A "Featured apps" option 816 is selectable to provide viewing of apps that are designated as featured, as discussed above.

In the region 818 of the interface, various selectable categories of apps are provided, enabling viewing of different categories of apps available to the user through the SMP.

It will be appreciated that in the illustrated implementation, apps may be prioritized for the user in accordance with any of the embodiments described herein.

Figure 9:
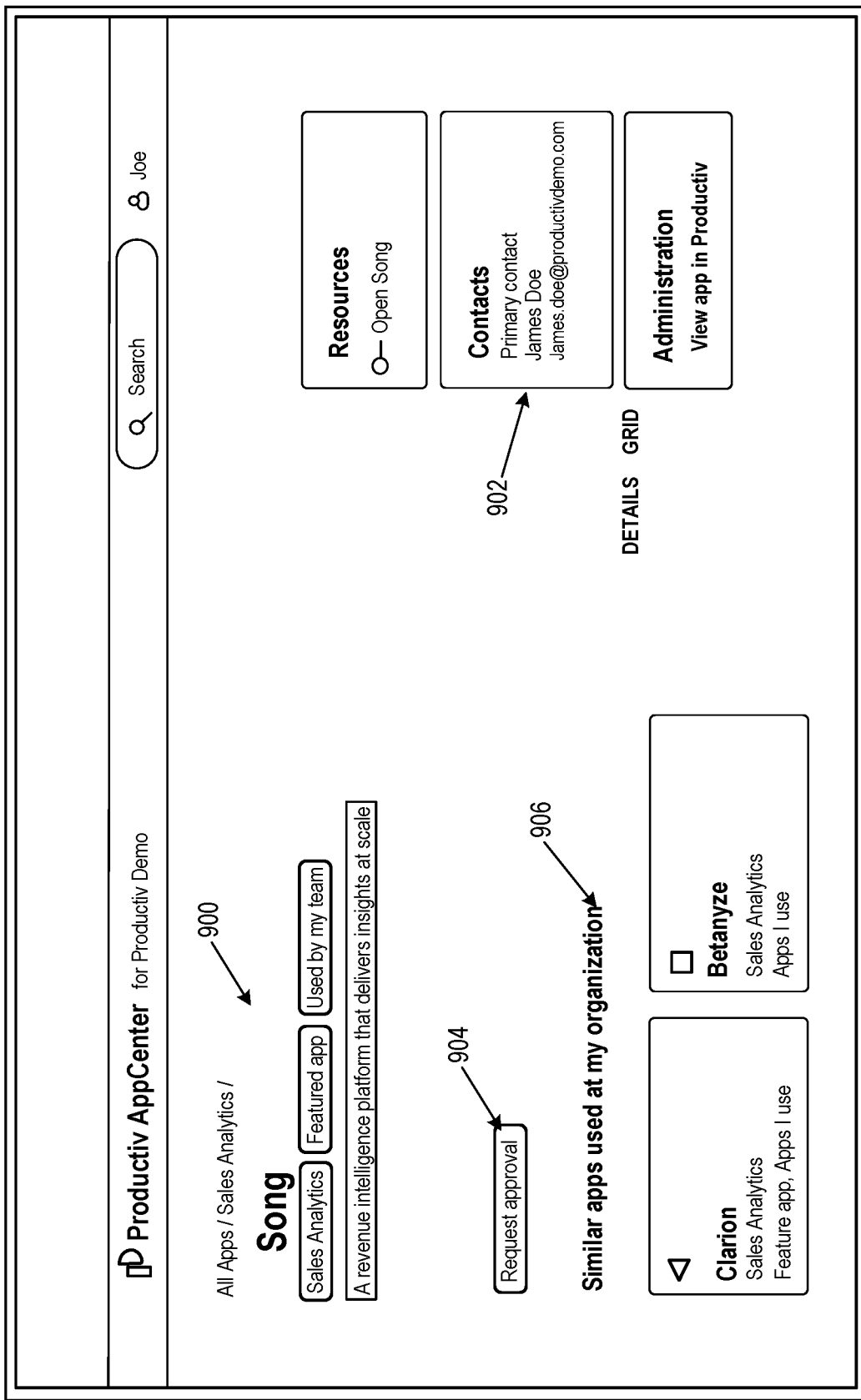
FIG. 9 illustrates an interface showing details of a specific app in the app store of the SMP, in accordance with implementations of the disclosure.

FIG. 9 illustrates an interface showing details of a specific app in the app store of the SMP, in accordance with implementations of the disclosure.

At reference 900, various information about the app is shown, including the app's name, category, designation of the app as featured, and indication of the app being used by the user's team. At reference 902, contact information of a designated contact for the app is shown, such as the name and email address of the designated contact.

A button 904 is selectable to request approval for the app.

At reference 906, additional similar apps used by the user's organization are displayed.

Figure 10:
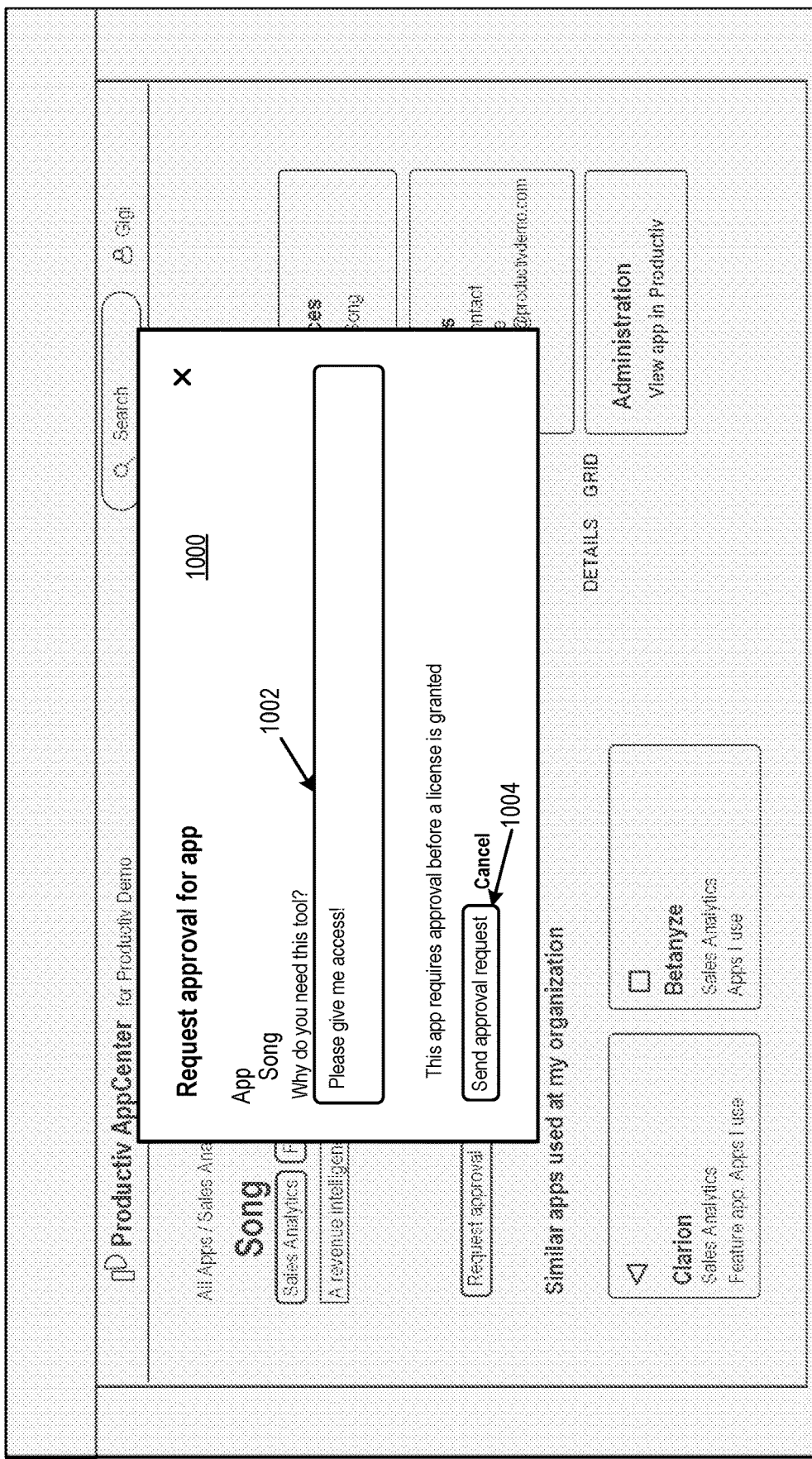
FIG. 10 illustrates an interface for requesting approval of an app, in accordance with implementations of the disclosure.

FIG. 10 illustrates an interface for requesting approval of an app, in accordance with implementations of the disclosure.

The illustrated interface is defined in a pop-up window 1000 that is displayed in response to selection of the button 904 described above. A text entry field 1002 is provided for the user to enter text elaborating on why the request for the app is being made. And a button 1004 is selectable to send the request for approval to the designated party (e.g. user's manager, designated app contact, etc.).

Figure 11:
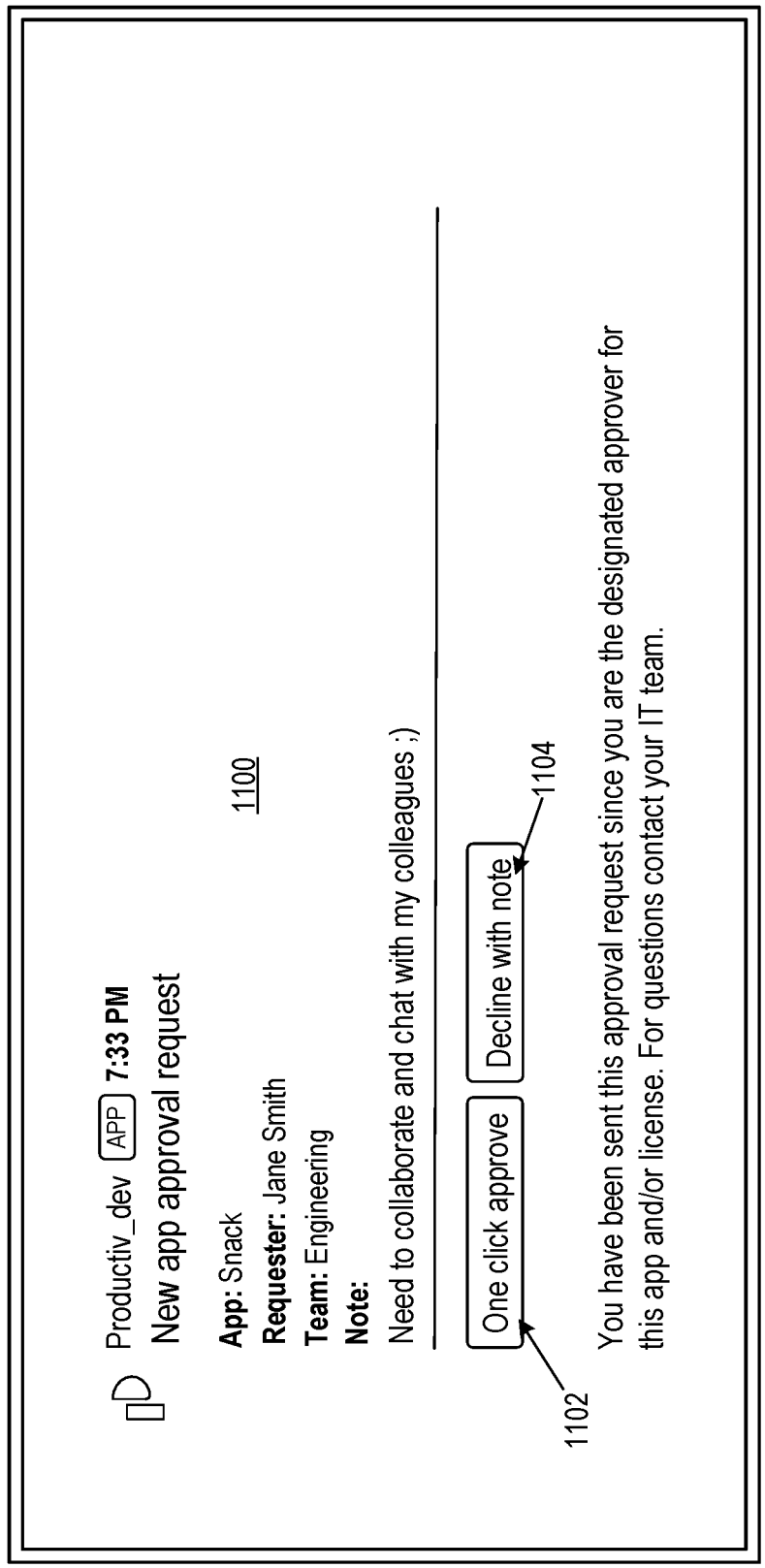
FIG. 11 illustrates an example of a message sent to an approver requesting their approval of a request for an app, in accordance with implementations of the disclosure.

FIG. 11 illustrates an example of a message sent to an approver requesting their approval of a request for an app, in accordance with implementations of the disclosure.

In the illustrated implementation, the message 1100 includes relevant information about the request, such as the app requested, the name of the requester, the team of the requester, and a note from the requester.

An approve button 1102 in the message is selectable by the approver to indicate approval of the request.

A decline button 1104 in the message is selectable by the approver to indicate disapproval of the request. In some implementations, selection of the decline button 1104 triggers an additional interface enabling entry of a note so that the approver may indicate why the request was declined.

The implementations of the present disclosure provide many advantages over existing systems and processes. Employee app adoption is enabled and improved by guiding employees to IT-approved apps. Employees receive app and license recommendations based on role, and can request apps with one click and stay updated about the process via communications (e.g. via Slack and email). On-demand employee app resource guidance and support is easily accessed through the system. Streamlined approvals eliminate manual app fulfillment burdens, replacing them with IT policy-based workflows. IT is enabled to create attribute-based approval rules, provide role-based license approval workflows, and facilitate direct approvals via communications channels (e.g. Slack or email). Automated fulfillment processes serve to reduce overall SaaS program risk with policy-configured fulfillment. Automated provisioning speeds the fulfillment process. And enforcement of consistent approval policies is enabled, while custom exception-based routing rules can be constructed. In summary, implementations of the present disclosure provide for faster app request fulfillment, reduction in time spent with manual approval and provisioning, and increases app adoption and employee satisfaction.

In one configuration, the SMP includes compute and storage resources for management of SaaS applications. As described above, a web user interface (UI) can be provided to enable remote client devices to use and access services of the SMP. In some implementations, at least some code integrated with the UI is configured to make API calls to the SMP to access data, compute and storage resources. In one embodiment, the compute and storage resources which run the SMP are run in a cloud-based environment. The cloud-based environment, for example, may be provided by a cloud compute and storage servicing entity, e.g., such as Amazon Web Services (AWS)TM, Google™ Cloud, Microsoft™ Azure™, or other serving entities. In some configurations, hybrid cloud systems may be used, wherein some processes are executed by a cloud compute and storage servicing entity and other processes are serviced by private servers and storage or a private cloud. In still other embodiments, the processing can be executed entirely on private services and storage or private cloud configuration. In some embodiments, the servicing entities are referred to as hosting services, which provide the hardware and internet connectivity to execute applications, processes, and workflows using various types of hardware configurations.

In some configurations, data that is retrieved from the various SaaS entities using APIs or other accessing code can be stored in one or more databases that make access and further processing more efficient. By way of example, a relational database may be executed for storing data, retrieval of data, and manipulation (e.g., processing) of data. In one embodiment, the database may use a structured query language (SQL) as the programming language that is used to manage relational database data and perform various operations on the data in them. Without limitation, sometimes databases may be referred to as relational database management systems (RDBMS), relational data stream management systems (RDSMS), or simply a database. Generally, relational databases are particularly useful in handling structured data, i.e., data incorporating relations among entities and variables, such as data obtained and processed by an SMP. It should be understood that other database standards or protocols can be used, so long as the processing of SaaS data can be performed for rendering benchmarking and analytics and/or presentation tasks.

In some configurations, the hardware configurations may include virtualized hardware and expandable storage to meet the processing needs of the SMP. Broadly speaking, the SMP is executed using cloud infrastructure, which includes the use of one or more multiple interconnected data centers throughout the world. Based on the load demands for servicing the SMP, the resources may be expanded.

It should be apparent that the present embodiments may be practiced without some or all of these specific details. Modification to the modules, code and communication interfaces are also possible, so long as the defined functionality for the SMP or modules of the SMP is maintained. In other instances, well-known process operations have not been described in detail in order not to unnecessarily obscure the present embodiments.

One or more embodiments can also be fabricated as computer-readable code on a non-transitory computer-readable storage medium. The non-transitory computer-readable storage medium is any non-transitory data storage device that can store data, which can thereafter be read by a computer system. Examples of the non-transitory computer-readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer-readable storage medium can include computer-readable storage medium distributed over a network-coupled computer system so that the computer-readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

While the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A method implemented in a Software as a Service (SaaS) management platform (SMP), the SMP implemented in a cloud resource having at least one processor and at least one storage device, the method comprising:
   identifying a plurality of SaaS applications that are used by a customer of the SMP;
   receiving, over a network, human resources (HR) data from an HR application, said HR data describing an organization chart of users that are employees of the customer of the SMP;
   providing, over a network, an administrator interface for rendering through a client device operated by an administrative user of the customer of the SMP;
   receiving input from the client device via the administrator interface, said input identifying a given SaaS application and a managerial group within the organization chart;
   and responsive to receiving said input, then storing an approval setting for the managerial group for the given SaaS application, the approval setting determines whether a user within the managerial group requires approval to enable granting of a license to use the given SaaS application.

2. The method of claim 1, wherein receiving the HR data includes accessing an application programming interface (API) of an HR SaaS application of which the customer is a subscriber.

3. The method of claim 1, wherein the organization chart defines a hierarchical reporting structure of the employees and further defines a plurality of managerial groups of the customer based on the hierarchical reporting structure.

4. The method of claim 1, wherein when the approval setting defines that a user within the managerial group does not require approval, then a request from a user within the managerial group to use the given SaaS application triggers automatic provisioning of the user for the given SaaS application.

5. The method of claim 4, wherein the automatic provisioning of the user includes triggering a single sign-on (SSO) service to provision the user for the given SaaS application.

6. The method of claim 1, wherein the approval setting defines that a user within the managerial group requires approval, and wherein the input further identifies an approver for users within the managerial group that request to use the given SaaS application.

7. The method of claim 6, wherein a request from a user within the managerial group to use the given SaaS application triggers automatic sending of a message to the approver.

8. The method of claim 7, wherein the message to the approver is configured to provide a response mechanism for enabling the approver to indicate a response to the request from the user.

9. The method of claim 8, wherein the input further identifies a second approver for the users within the managerial group that request to use the given SaaS application, and wherein the request from the user to use the given SaaS application triggers automatic sending of a message to the second approver upon triggering of the response mechanism indicating approval of the request by the approver.

10. The method of claim 1, wherein the received input from the client device further identifies a location, country or geolocation, and wherein the approval setting further determines whether a user at the location, country, or geolocation requires approval to enable granting of a license to use the given SaaS application.

11. A method implemented in a Software as a Service (SaaS) management platform (SMP), the SMP implemented in a cloud resource having at least one processor and at least one storage device, the method comprising:
   identifying a plurality of SaaS applications that are used by a customer of the SMP;
   receiving, over a network, human resources (HR) data from an HR application, said HR data identifying a plurality of locations of users that are employees of the customer of the SMP;
   providing, over a network, an administrator interface for rendering through a client device operated by an administrative user of a customer of the SMP;
   receiving input from the client device via the administrator interface, said input identifying a given SaaS application and a given location that is one of the plurality of locations;
   and responsive to receiving said input, then storing an approval setting for the given location for the given SaaS application, the approval setting determines whether a user at the given location requires approval to enable granting of a license to use the given SaaS application.

12. The method of claim 11, wherein receiving the HR data includes accessing an application programming interface (API) of an HR SaaS application of which the customer is a subscriber.

13. The method of claim 11, wherein the locations define one or more of a city, country or geolocation.

14. The method of claim 11, wherein when the approval setting defines that a user at the given location does not require approval, then a request from a user at the given location to use the given SaaS application triggers automatic provisioning of the user for the given SaaS application.

15. The method of claim 14, wherein the automatic provisioning of the user includes triggering a single sign-on (SSO) service to provision the user for the given SaaS application.

16. The method of claim 11, wherein the approval setting defines that a user at the given location requires approval, and wherein the input further identifies an approver for users at the given location that request to use the given SaaS application.

17. The method of claim 16, wherein a request from a user at the given location to use the given SaaS application triggers automatic sending of a message to the approver.

18. The method of claim 17, wherein the message to the approver is configured to provide a response mechanism for enabling the approver to indicate a response to the request from the user.

19. The method of claim 18, wherein the input further identifies a second approver for the users at the given location that request to use the given SaaS application, and wherein the request from the user to use the given SaaS application triggers automatic sending of a message to the second approver upon triggering of the response mechanism indicating approval of the request by the approver.

20. The method of claim 11, wherein the organization chart defines a hierarchical reporting structure of the employees and further defines a plurality of managerial groups of the customer based on the hierarchical reporting structure, and wherein the input from the client device further defines a given managerial group, and wherein the approval setting is stored for the given managerial group.

* * * * *